US012220649B2

(12) United States Patent
Moore et al.

(10) Patent No.: US 12,220,649 B2
(45) **Date of Patent: *Feb. 11, 2025**

(54) INFLATABLE ORNAMENT APPARATUS

(71) Applicant: HOLIBALL INC., Houston, TX (US)

(72) Inventors: Kristy Moore, Friendswood, TX (US); Jennifer Leigh Couch, Houston, TX (US); Amberly Hall, Houston, TX (US)

(73) Assignee: HOLIBALL INC., Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/386,712

(22) Filed: Nov. 3, 2023

(65) Prior Publication Data

US 2024/0066421 A1 Feb. 29, 2024

Related U.S. Application Data

(63) Continuation of application No. 18/203,686, filed on May 31, 2023, now Pat. No. 11,833,440, which is a (Continued)

(51) Int. Cl.
*A63H 27/10* (2006.01)
*F21V 3/02* (2006.01)
*F21Y 115/10* (2016.01)

(52) U.S. Cl.
CPC ............ *A63H 27/10* (2013.01); *F21V 3/023* (2013.01); *A63H 2027/1058* (2013.01); *A63H 2027/1075* (2013.01); *F21Y 2115/10* (2016.08)

(58) Field of Classification Search
CPC ........... A63H 27/10; A63H 2027/1041; A63H 2027/1058; A63H 2027/1075; A63H 2027/1091; F21V 3/023; F21V 3/026
(Continued)

(56) References Cited

U.S. PATENT DOCUMENTS

| | | | |
|---|---|---|---|
| 1,530,923 | A | 3/1925 | Anns |
| 1,858,991 | A | 5/1932 | Frost |

(Continued)

FOREIGN PATENT DOCUMENTS

| | | | |
|---|---|---|---|
| CN | 201295115 | Y | 8/2009 |
| DE | 1776183 | U | 10/1958 |

OTHER PUBLICATIONS

Title: Giant Inflatable Ornaments, The GreenHead Finds Cool New Stuff; URL: https://www.thegreenhead.com/2009/11/giant-inflatable-ornaments.php/ (published Nov. 29, 2009; date accessed Nov. 30, 2022).

(Continued)

*Primary Examiner* — Joseph B Baldori
(74) *Attorney, Agent, or Firm* — Harness, Dickey & Pierce, PLC

(57) ABSTRACT

An inflatable globe has a generally round shape and an attachment pin, plug or other closure mechanism coupled to the top of the inflatable globe. A topper is configured to fit over the attachment pin, plug or other closure mechanism. A hanger is threaded through the attachment pin, plug or closure mechanism and then through the topper. An electric light coupled to the plug is suspended inside the globe. The inflatable globe is made of a resilient polymer material and can be monochromatic or comprise a plurality of colors.

25 Claims, 7 Drawing Sheets

Related U.S. Application Data continuation of application No. 29/866,778, filed on Sep. 27, 2022, and a continuation of application No. 29/866,776, filed on Sep. 27, 2022, said application No. 29/866,778 is a continuation of application No. 17/187,072, filed on Feb. 26, 2021, now Pat. No. 11,484,808, said application No. 29/866,776 is a continuation of application No. 17/187,072, filed on Feb. 26, 2021, now Pat. No. 11,484,808.

(60) Provisional application No. 62/989,225, filed on Mar. 13, 2020.

(58) Field of Classification Search
USPC .................................................. 446/220, 222
See application file for complete search history.

(56) References Cited

U.S. PATENT DOCUMENTS

| | | | | | |
|---|---|---|---|---|---|
| 2,619,303 | A | | 11/1952 | Martin | |
| 3,035,162 | A | | 5/1962 | Emmich | |
| 3,694,648 | A | | 9/1972 | Yates | |
| 3,900,638 | A | | 8/1975 | Du Bato | |
| 4,358,487 | A | | 11/1982 | Walker | |
| 4,452,836 | A | | 6/1984 | Daniel | |
| 4,934,986 | A | | 6/1990 | Wallace | |
| 5,117,344 | A | | 5/1992 | Perez | |
| 5,119,281 | A | | 6/1992 | Akman | |
| 5,378,512 | A | * | 1/1995 | Van Wyk | F21S 4/10 428/34.4 |
| 5,399,391 | A | * | 3/1995 | Perez-Viera | A47G 33/08 428/101 |
| 5,714,211 | A | | 2/1998 | Zinbarg et al. | |
| 6,048,591 | A | | 4/2000 | Zwiebel | |
| 6,217,956 | B1 | | 4/2001 | Heidkamp | |
| 6,399,167 | B1 | * | 6/2002 | Lewis, Jr. | A47G 33/08 428/542.2 |
| D483,234 | S | | 12/2003 | Hansen | |
| 6,739,725 | B2 | * | 5/2004 | Ben-Ari | G03B 21/62 446/175 |
| 7,077,553 | B2 | | 7/2006 | Vanderschuit | |
| 7,204,740 | B2 | | 4/2007 | Petell | |
| D545,974 | S | | 7/2007 | Nan | |
| 7,311,580 | B2 | | 12/2007 | Moomaw | |
| 7,344,267 | B2 | * | 3/2008 | Carito | A63H 27/10 362/205 |
| 7,364,488 | B2 | * | 4/2008 | Mueller | F21V 3/023 446/224 |
| 8,292,454 | B2 | | 10/2012 | Schrimmer | |
| 8,968,047 | B1 | * | 3/2015 | Wicken | F16M 13/02 248/346.03 |
| 9,186,593 | B2 | * | 11/2015 | Chicarella | B32B 9/045 |
| 9,192,872 | B2 | * | 11/2015 | Hakam | F21V 3/023 |
| 9,498,734 | B2 | * | 11/2016 | Bo | A63H 27/10 |
| D876,984 | S | | 3/2020 | Richardson | |
| D885,248 | S | | 5/2020 | Richardson | |
| 10,687,648 | B1 | * | 6/2020 | Lowe | A47G 33/10 |
| 10,814,239 | B1 | * | 10/2020 | Allard | A63H 27/10 |
| 10,907,817 | B2 | | 2/2021 | Qin | |
| 11,162,596 | B1 | * | 11/2021 | Davis | F16K 31/44 |
| 11,287,103 | B2 | | 3/2022 | Palumbo | |
| 11,484,807 | B2 | * | 11/2022 | Wang | F21S 9/02 |
| 11,484,808 | B2 | | 11/2022 | Moore et al. | |
| 11,534,698 | B1 | | 12/2022 | You et al. | |
| 11,833,440 | B2 | | 12/2023 | Moore et al. | |
| D1,010,494 | S | | 1/2024 | Yu | |
| 2002/0089843 | A1 | * | 7/2002 | Lou | F21V 3/023 362/186 |
| 2005/0073835 | A1 | * | 4/2005 | Kett | F21V 3/023 362/154 |
| 2005/0269442 | A1 | | 12/2005 | Nguyen | |
| 2007/0019403 | A1 | | 1/2007 | Boghossian | |
| 2011/0281047 | A1 | * | 11/2011 | Ansolabehere | B29D 22/02 156/182 |
| 2012/0289120 | A1 | * | 11/2012 | Nelson | A63H 27/10 446/224 |
| 2022/0047049 | A1 | | 2/2022 | Kim | |

OTHER PUBLICATIONS

Title: DIV Giant Ornament Holiday Décor I Have a ball! These oversized ornaments are made out of inflatable beach balls. | By HGTV | Facebook; URL: https://www.facebook.com/HGTV/videos/10155442862964213/ (published Nov. 8, 2017; date accessed Nov. 11, 2022).
Title: Inflatable Ornament 3m | Backdrops Fantastic Australia; URL: http://web.archive.org/web/20190324054835/https://www.backdrops.com.au/backdrops/inflatable-ornament/ (published at least as early as Mar. 24, 2019); date accessed Nov. 11, 2022.
Title: Inflatable Holiday . . . —Inflatable Holiday Ornaments; URL: https://m.facebook.com/Inflatableornaments/photos/pb.100069379472644.-2207520000./949821578430486/?type=3&_rdr (published Oct. 18, 2015; date accessed Nov. 11, 2022).
Title: LED Light Up Beach Ball—YouTube; URL: https://www.youtube.com/watch?v=7Qh6syA_gUg (published: May 22, 2017: date accessed Nov. 11, 2022).
Title: How to make a giant Light-up Christmas Ornament—YouTube URL: https://www.youtube.com/watch?v=ZPxbQQc8dJY (published Nov. 19, 2017; date accessed Nov. 11, 2022).
Title: Facebook; URL: http://www.facebook.com/refabbedbybrooke/photos/a.1578983949017919/2056135097969466/ (published Jul. 1, 2018; date accessed Nov. 8, 2022).
TITLE: Facebook; URL: https://www.facebook.com/stagedbydesigntx/photos/a.866509390171534/1405068849648916/ (published Oct. 14, 2018; date accessed Nov. 8, 2022).
Title: Balloon Party Lights; URL: https://web.archive.org/web/20170617173358/https://www.glow.co.uk/balloon-string-lights.html; (published Jul. 16, 2017; date accessed Nov. 10, 2022).
https://web.archive.org/web/20170617173358/https://www.glow.co.uk/balloon-string-lights.html; (published Jul. 16, 2017; dated accessed Nov. 10, 2022.
National Artcraft 5/8" Gold Finish Ornament Cap with Wire Loop, Amazon, https://www.amazon.com/National-Artcraft-Finishing-Porcelain-Ornaments/dp/B07PP8FB3Z (offered for sale or published Apr. 1, 2017).

* cited by examiner

INFLATABLE ORNAMENT APPARATUS

CROSS REFERENCE TO RELATED APPLICATIONS

This application is a continuation of U.S. patent application Ser. No. 18/203,686, filed on May 31, 2023, which is a continuation of U.S. patent application Ser. No. 29/866,778, filed on Sep. 27, 2022, which is a continuation of U.S. patent application Ser. No. 17/187,072, filed on Feb. 26, 2021 which issued as U.S. Pat. No. 11,484,808, which claims priority to U.S. Provisional Patent Application No. 62/989, 225, filed on Mar. 13, 2020, all of which are incorporated by reference herein.

This application is also a continuation of U.S. patent application Ser. No. 18/203,686, filed on May 31, 2023, which is a continuation of U.S. patent application Ser. No. 29/866,776, filed on Sep. 27, 2022, which is a continuation of U.S. patent application Ser. No. 17/187,072, filed on Feb. 26, 2021 which issued as U.S. Pat. No. 11,484,808, which claims priority to U.S. Provisional Patent Application No. 62/989,225, filed on Mar. 13, 2020, all of which are incorporated by reference herein.

TECHNICAL FIELD

The present invention relates to holiday ornaments.

BACKGROUND OF THE INVENTION

Holiday ornaments, baubles, "Christmas bulbs" or "Christmas bubbles" or "Christmas balls" are decorations that are usually made of blown glass, metal, wood, blown plastics, expanded polystyrene or ceramics and are typically used to decorate a Christmas tree. Ornaments take many different forms, from a simple round ball to highly artistic designs. Ornaments are almost always reused year after year rather than purchased annually, and family collections often contain a combination of commercially produced ornaments and decorations created by family members. Such collections are often passed on and augmented from generation to generation.

Such holiday ornaments are small in size, having circumference of between 2 inches and 5 inches. What is desired is a much larger ornament made of a resilient material that is capable of being deployed in the outdoors in yards or on live trees, and which can be internally illuminated. The invention comprises such an ornament.

SUMMARY OF THE INVENTION

The invention is an inflatable, resilient, plastic polymer globe with a plastic-coated topper and hanger for use as a holiday decoration. The invention can be deflated to allow efficient storage. The invention has several components including the inflatable globe with attachment pin, light source, closure mechanism, topper and hanger. While the invention is directed for use as a Christmas ornament, it can be used without the topper for other occasions.

To those skilled in the art to which this invention relates, many changes in construction and widely differing embodiments and applications of the invention will suggest themselves without departing from the scope of the invention as defined herein. The disclosures and the descriptions herein are purely illustrative and are not intended to be in any sense limiting.

BRIEF DESCRIPTION OF THE DRAWINGS

For a better understanding of the present invention including the features, advantages and specific embodiments, reference is made to the following detailed description along with accompanying Figures, in which.

DETAILED DESCRIPTION

Figure 1:
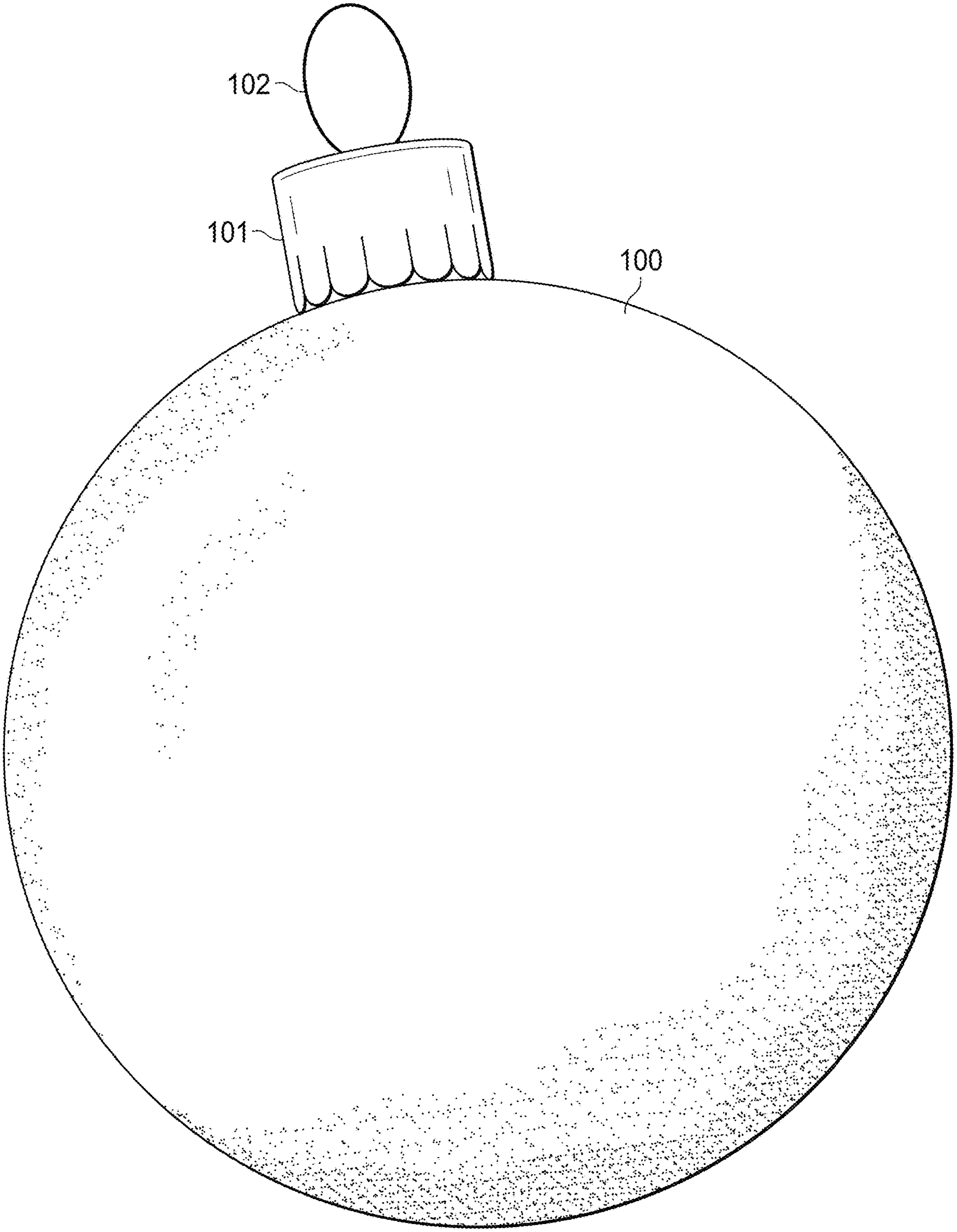
FIG. 1 is a side-view of the assembled invention in an embodiment.

While the making and using of the disclosed embodiments of the present invention is discussed in detail below, it should be appreciated that the present invention provides many applicable inventive concepts which can be embodied in a wide variety of specific contexts. Some features of the preferred embodiments shown and discussed may be simplified or exaggerated for illustrating the principles of the invention.

The invention is an inflatable, resilient, plastic polymer globe for use as a holiday decoration. More specifically, the invention is a holiday apparatus, comprising an inflatable globe having a generally round shape and circumference of between 2 feet and 10 feet with an opening allowing ingress into the interior of the globe. A closure mechanism securely couples to opening into the inflatable globe thus restricting the egress of air from the inflatable globe. A topper is configured to fit over the closure mechanism and a hanger is configured to be threaded through the closure mechanism. Without limiting the materials used to make the invention in an embodiment, the inflatable globe is made of a resilient polymer material and the topper is made of a molded plastic material. The topper comprises a cylindrical shape having a substantially closed upper surface with an orifice therethrough for accepting the closure mechanism and hanger and a side extending down from the upper surface. Further, the topper has a finish that is selected from the group consisting or electroplated and painted. The opening into the inflatable globe can be a threaded attachment pin having a cylindrical orifice being a conduit into the interior of the globe. The closure mechanism couples to the attachment pin at the top of the inflatable globe. Alternatively, the opening is a inwardly cylindrical portion of the inflatable globe that extends into the interior of the inflatable globe and the closure mechanism is a plug that is received into the opening. A light source can be located at an end of said plug, said light source being a compact electric light source such as a Light-Emitting Diode and powered by one from the group consisting of an internal battery, external battery unit and solar panel via wires extending through said attachment pin and topper. Further, the closure mechanism can comprise a threaded portion configured to be coupled to the integrated attachment pin. The hanger can be made from one selected from the group consisting of steel, plastic, string, and cord. The inflatable globe can be red or green or other color and can be monochromatic or having a pattern of a plurality of colors.

The invention further comprises an inflatable globe having a generally round shape and circumference of between 2 feet and 10 feet and an opening into the interior of the globe located at the top of said inflatable globe. A removable ribbed plug is configured to be received into the opening in the top of said globe having a conical flared stopper near its midpoint, and a through-hole at its upper end and is operable to maintain air pressure in said inflatable globe when inserted. Further, a topper is configured to fit over the removable threaded attachment pin and a hanger is threaded through the through-hole at the upper end of said removable attachment pin.

This embodiment of the invention further comprises a light source at an end of said removable ribbed plug, said light source being a compact electric light source such as a Light-Emitting Diode and wherein said light source is powered by one from the group consisting of an internal battery, external battery unit and solar panel via wires extending through said attachment pin and topper. A further embodiment of the invention is an inflatable holiday apparatus, comprising an inflatable globe with an attachment pin, said attachment pin extending a short distance through a threaded or ridged opening on the top of said inflatable globe such that one end of said attachment pin defined as the interior end is inside said globe when assembled, said attachment pin comprising a threaded section corresponding to said threaded or ridged opening on the top of said inflatable globe. Said embodiment further includes a topper, a hanger, and a light source at said interior end of said attachment pin, said light source being a compact electric light source such as a Light-Emitting Diode wherein said light source is powered by one from the group consisting of an internal battery, external battery unit and solar panel via wires extending through said attachment pin and topper.

Figure 2:
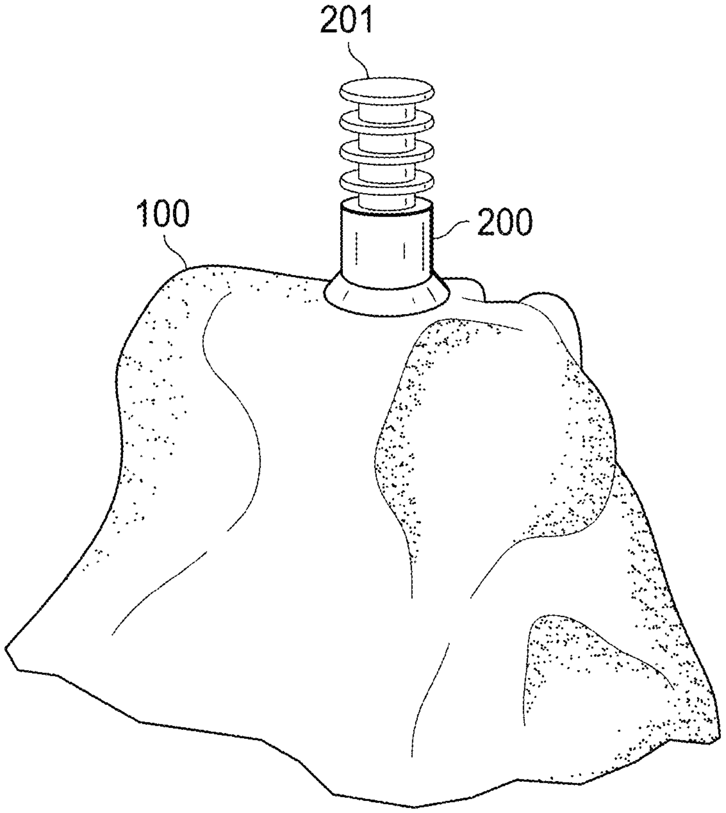
FIG. 2 is a close view of the globe component in a deflated state in an embodiment of the invention.
Figure 3:
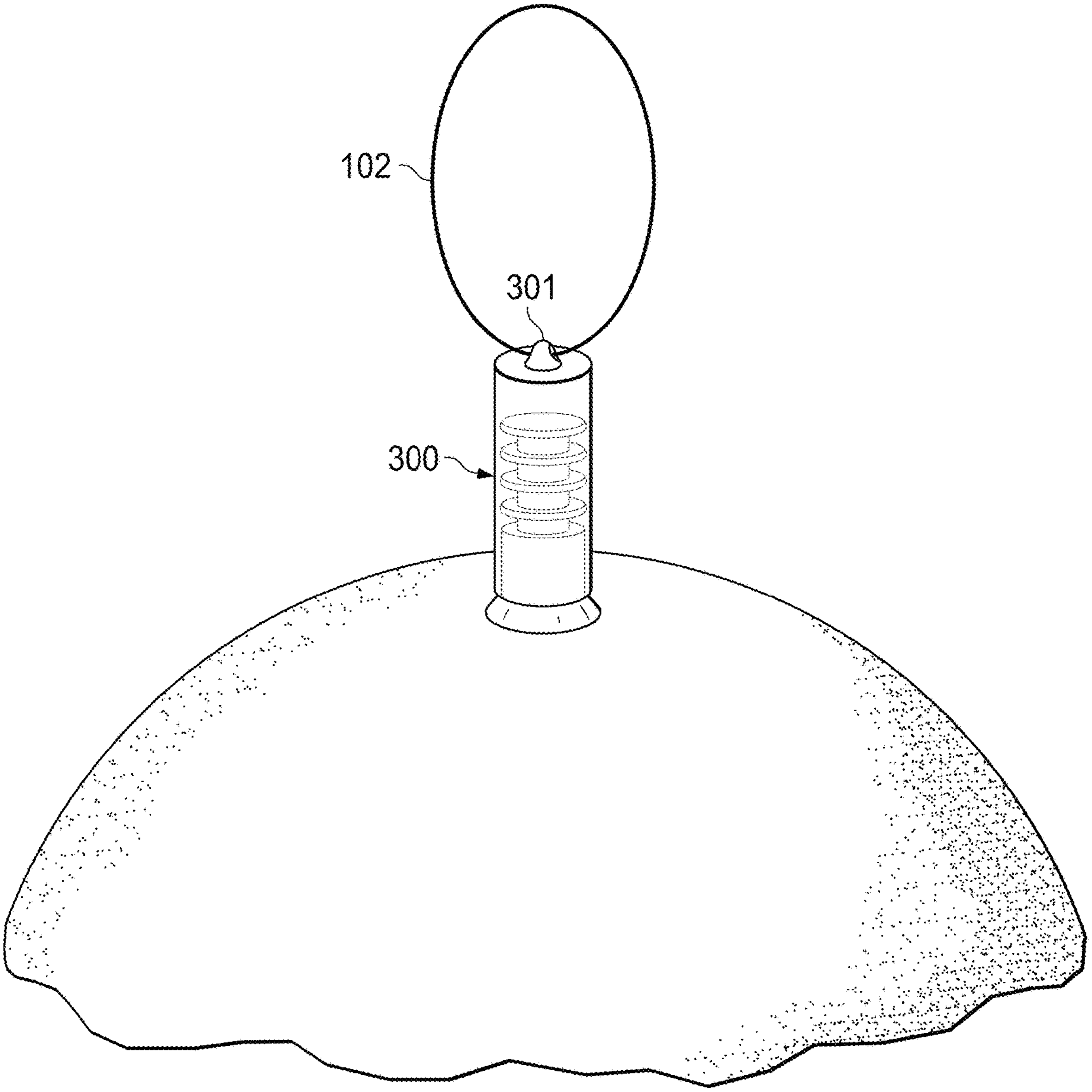
FIG. 3 is a close view of the assembled inflated globe, closure mechanism, and hanger components in an embodiment of the invention.
Figure 4:
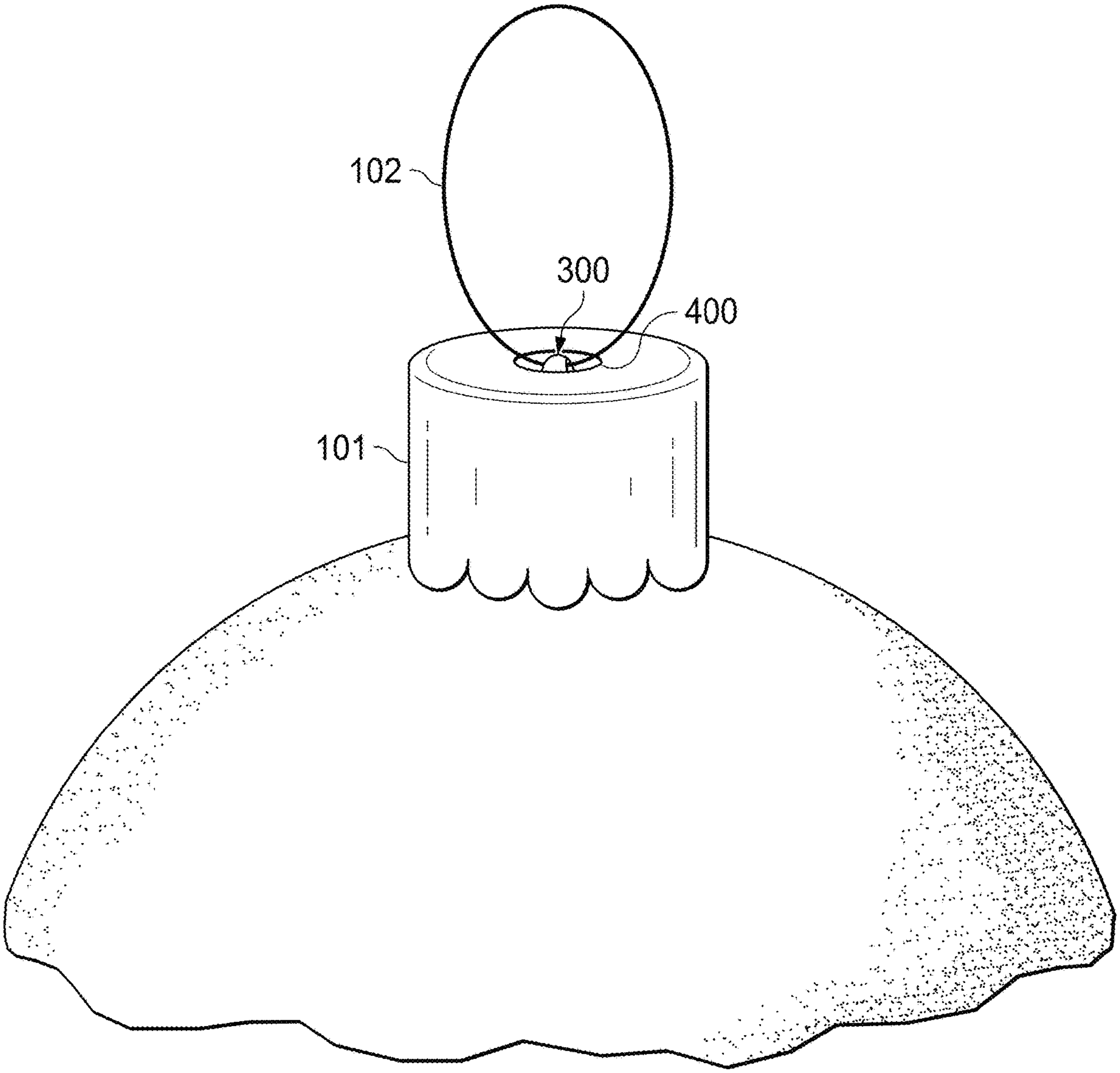
FIG. 4 is a close view of the assembled inflated globe, hanger, and topper components in an embodiment of the invention.

Now referring to the Figures, in an embodiment the invention has several components. As seen in FIG. 1, these include an inflatable globe 100 having a topper 101 and hanger 102. Closure mechanism 300 (seen in FIG. 3) is located under topper 101. FIG. 2 shows deflated inflatable globe 100, integrated attachment pin 200, and external threaded or ridged section 201. Referring to FIG. 3, said closure mechanism 300 comprises a hollow cylinder having at its upper end an endcap and extended loop opening 301, and having an internal threaded or ridged section extending inward from its interior surface, said threaded or ridged section corresponding to an external threaded or ridged section 201 on the outer surface of said integrated attachment pin 200. Following inflation of inflatable globe 100, closure mechanism 300 is fitted to attachment pin 200 such that air pressure is maintained inside said globe. Referring to FIG. 4, hanger 102 is looped through opening 301 at the upper end of the closure mechanism 300. Said hanger 102 is then compressed by a user such that it presents a smaller diameter and inserted through an opening 400 in the upper surface of topper 101, topper 101 then being lowered on to the closure mechanism 300. Said hanger 102 can be made of steel, plastic, string, cord or similar material.

Figure 5A:
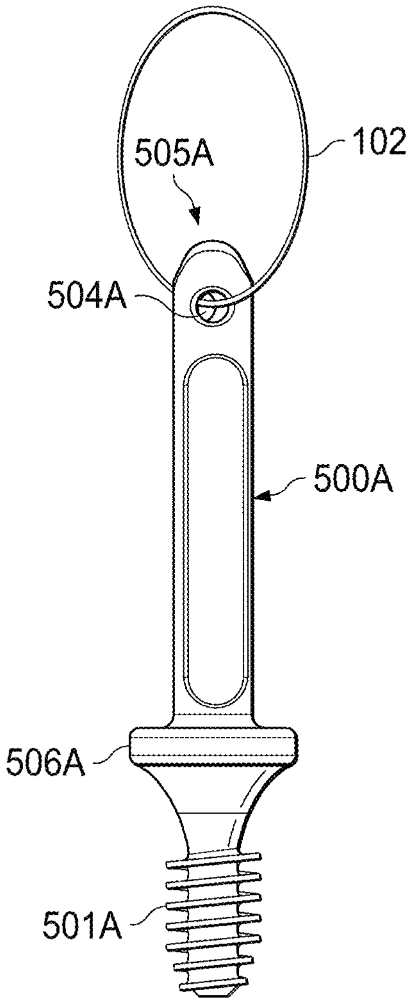
FIGS. 5A and 5B are side views of the pin and plug components used with embodiments of the invention.
Figure 5B:
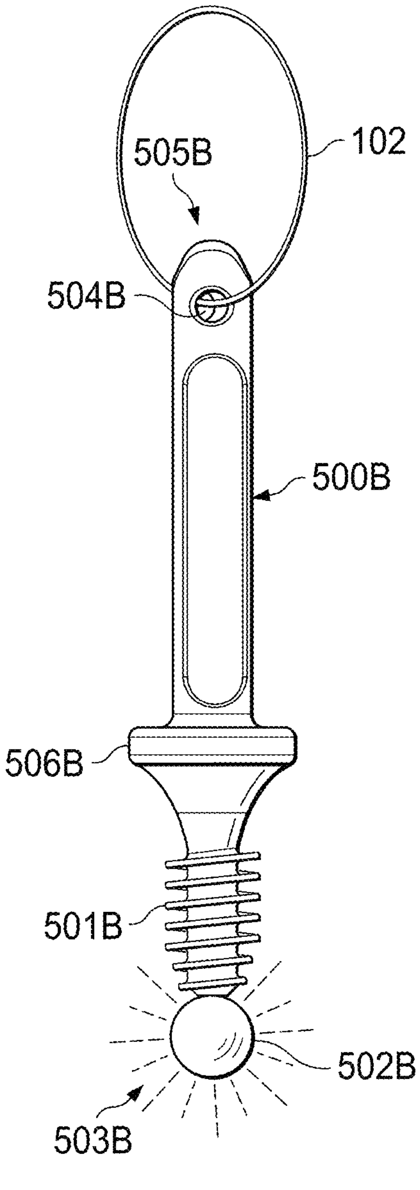
Figure 6:
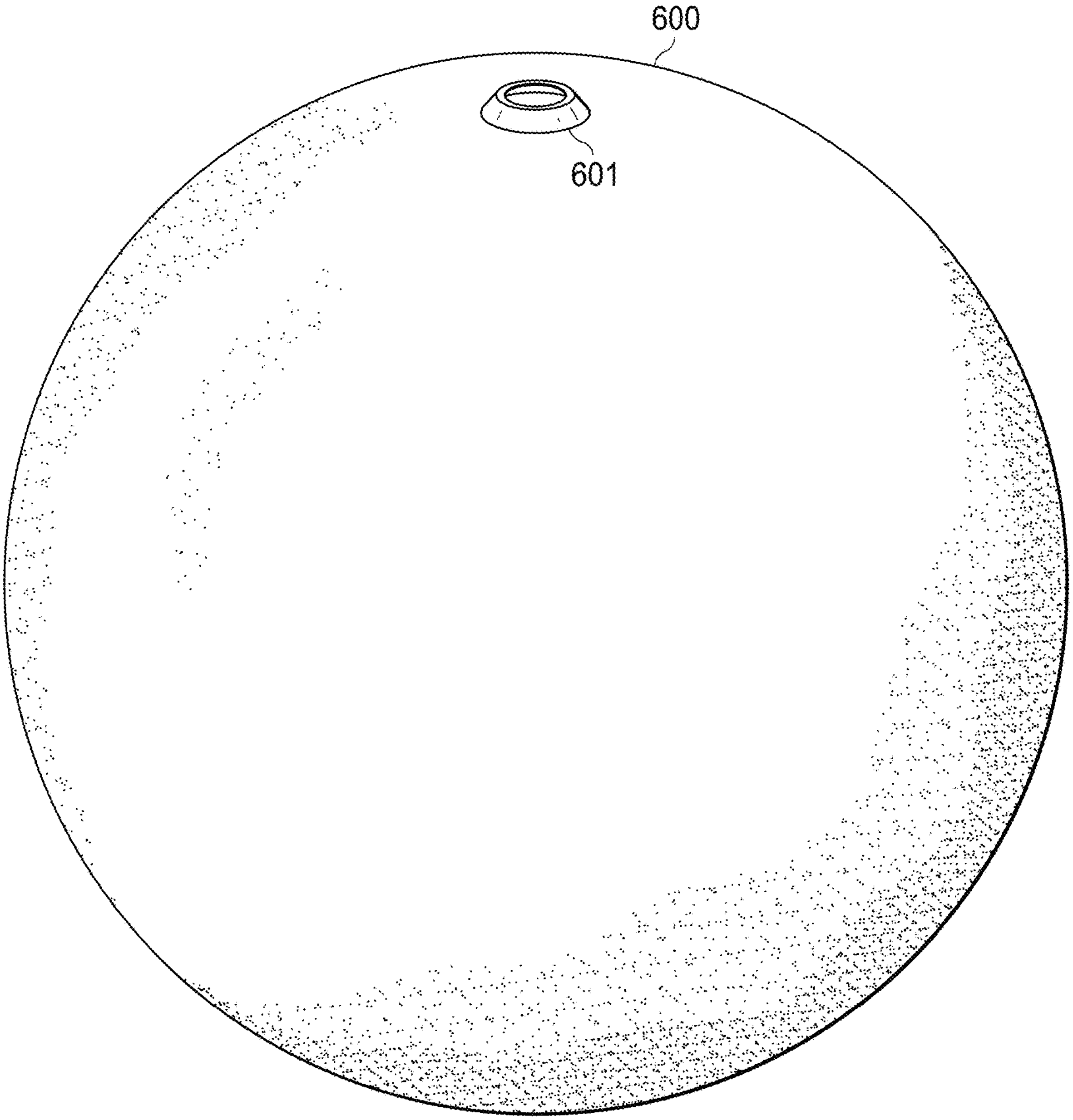
FIG. 6 is a close view of the globe component of the further embodiment of the invention.
Figure 7:
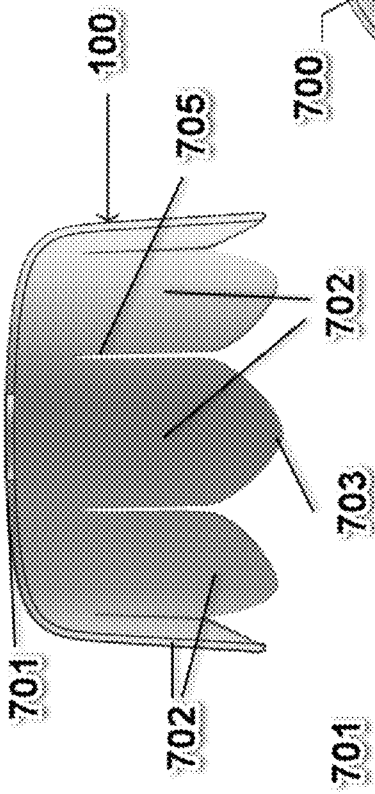
FIG. 7 is a cross-sectional view through the topper of the invention.
Figure 10:
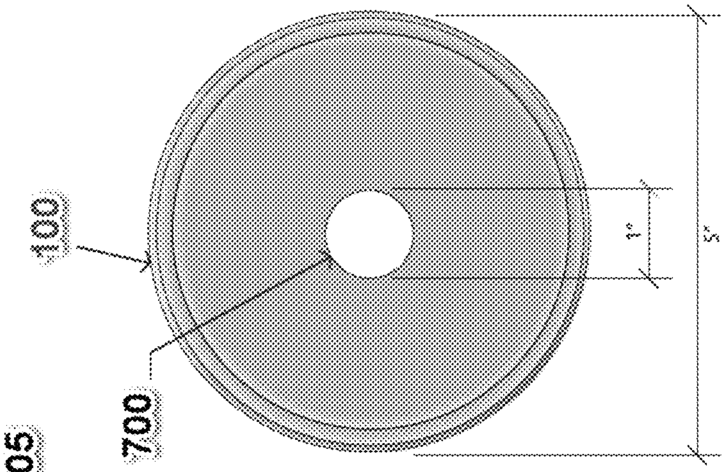
FIG. 10 is a bottom view of the topper of the invention.
Figure 9:
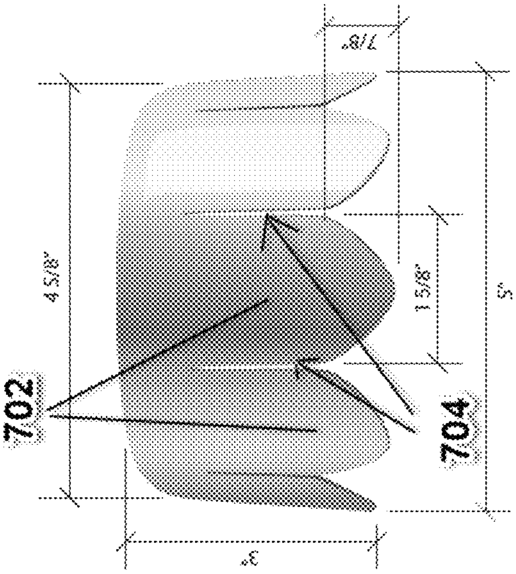
FIG. 9 is a side view of the topper of the invention.
Figure 8:
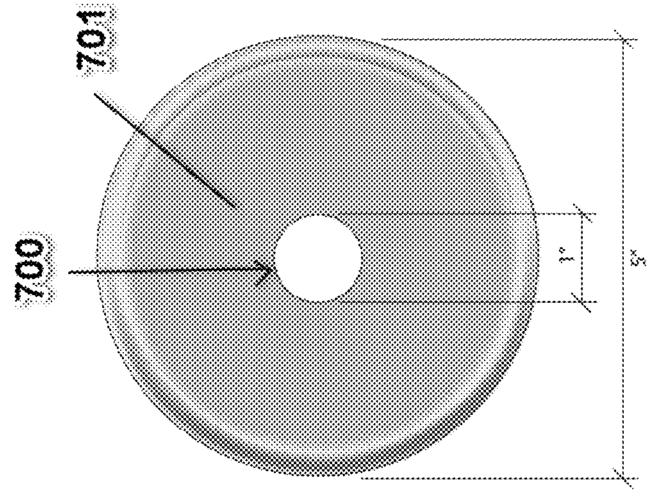
FIG. 8 is a top view of the topper of the invention.

In another embodiment, referring to FIGS. 5A, 5B and 6, the components of the invention include an inflatable globe 600, topper, hanger 102, and plug 500A, 500B, said plug 500A, 500B extending a short distance through a threaded or ridged opening 601 on the top of said inflatable globe 600 such that one end of said plug 500A, 500B defined as the interior end is inside said globe when assembled, said plug comprising a threaded or ribbed section 501A, 501B corresponding to said threaded or ridged opening 601 on the top of said globe and operable to retain air inside the inflatable globe. As seen in FIG. 5B, and a light source 502B at said interior end 503B of said plug 500B, said light source 502B being a compact electric light source such as a Light-Emitting Diode; said light source is powered by an internal battery, external battery unit or solar panel via wires extending through said plug and topper. The hanger 102 is looped through an opening 504A, 504B located at the exterior end 505A, 505B of plug 500A, 500B, said exterior end 505A, 505B being outside said inflatable globe when invention is assembled. In this embodiment, plug 500A, 500B further comprises at its midpoint a flared conical stopper 506A, 506B to maintain air pressure in said inflatable globe when said plug 500A, 500B is inserted.

An advantage of the invention is that it can be inflated to a circumference of several feet or meters and then be deflated after use to allow for efficient storage. The invention includes an ultraviolet (UV) resistant coating, and is durable for use in any weather condition.

The invention is preferably inflated with an electric fast flow inflator. In an embodiment, referring to FIGS. 2 through 4, once globe 100 is at its desired size, the attachment pin 200 on the globe 100 is plugged with the closure mechanism 300. The hanger 102 is coupled to the closure mechanism 300. The topper 101 is placed over the closure mechanism 300. The inflated ornament can then be hung to a tree or tethered to the ground.

In a further embodiment, referring to FIGS. 5 and 6 once globe 600 is at its desired size, the plug 500A, 500B is inserted through opening 601 in globe 600. The hanger 102 is coupled to the plug 500A, 500B. The topper is placed over the hanger and plug. In a further embodiment, a light source such as a light emitting diode can be positioned at the end of the plug and powered by an internal or external power source. The inflated ornament can then be illuminated and hung to a tree or tethered to the ground. The illumination is further adapted to be controlled by a local switch or timer. Illumination can also be controlled by a remote device such as a standalone unit or smartphone running a dedicated application, control signals being sent to electronics integrated into said attachment pin or topper by wireless means such as 2.4 GHz radio or Bluetooth™, said integrated electronics including a receiving antenna, non-volatile memory, and processor capable of running a program in the form of instructions stored in said memory.

The topper is comprised of a resilient material such as molded plastic and is electroplated or painted with a shiny finish to suggest the appearance of a glass ornament. While the invention is directed for use as a Christmas ornament, it can be used without the topper for other occasions.

More generally, the invention is a holiday apparatus comprising an inflatable globe having a generally round shape and circumference of between 1 foot and 20 feet. When plugged, the globe is impervious to release of air that is injected therein prior to plugging. An attachment pin is attached or coupled to the top of the globe for accepting a closure mechanism. A topper is configured to fit over the closure mechanism. A hanger is threaded through an orifice at the end of the closure mechanism and through an opening or orifice in the top surface of the topper.

The inflatable globe is preferably made of a resilient polymer material. The topper is preferably made of a molded plastic material and comprises a cylindrical shape having a substantially closed upper surface with an orifice therethrough for accepting the attachment pin, closure mechanism and hanger and a cylindrical side wall extending down from the upper surface. In an embodiment, the side wall of the topper has decorative notches cut into the side thereof. The topper is electroplated or painted or can be molded into its final color. The closure mechanism is preferably a threaded plug but also can be any suitable mechanism configured to keep injected air from escaping from the globe. The hanger that is threaded through the plug is made from a material selected from the group consisting of steel, plastic, string, cord or similar material. The globe is monochromatic or can be comprised of a plurality of colors.

In an embodiment the inflatable ball further comprises an electronic light such as an LED suspended therein, said light being powered by a replaceable or rechargeable battery, or solar panel or other external power source. In an embodiment, said light is coupled to a switch and can be set to on or off. In another embodiment, said light is coupled via a wireless receiver to a remote control and can be set to on or off using said remote. In a further embodiment, the inflatable ball comprises multiple lights such as LEDs suspended therein, said lights emitting different or varied colors, and the desired emitted light color can be controlled via said switch or remote by mixing the intensity of the individual lights.

In another embodiment, the diameter of the inflated globe is 30 inches or 18.5 inches. More specifically referring to FIGS. 7-10, topper 100 includes a single, 1 inch diameter and central hollow hole 700 centrically located within an upper laterally enlarged surface 701 with a top view peripheral diameter of 5 inches. The topper further includes multiple downwardly and longitudinally extending fingers 702, each having a curved and arcuately pointed end 703 opposite upper surface 701. An elongated and longitudinally extending slot or gap 704 is located between lateral side edges 705 of each pair of fingers 702, and each slot 704 extends over a majority distance between end 703 and upper surface 701 of each adjacent finger 702. Each finger 702 is longitudinally longer than wider. Moreover, the topper is ⅛ inch thick plastic, with chrome plated silver and chrome plated gold options.

The embodiments shown and described above are only exemplary. Even though numerous characteristics and advantages of the invention have been set forth in the foregoing description, the disclosure is illustrative only and changes may be made within the principles of the invention to the full extent indicated by the broad general meaning of the terms used herein. Various alterations, modifications and substitutions can be made to the disclosed invention without departing in any way from the spirit and scope of the invention.

The invention claimed is:

1. A decorative ornamental apparatus comprising:
- (a) an inflatable and deflatable globe comprising a resilient polymer material, the globe including an air opening configured to allow inflation air into an interior of the globe; and
- (b) a plug removably received in the air opening to restrict undesired air egress from the interior of the globe, the plug comprising:
  - (i) an externally threaded or externally ribbed attachment section;
  - (ii) a flared stopper configured to maintain air pressure in the inflatable globe when the plug is inserted therein;
  - (iii) a middle section, the middle section being longitudinally longer than wider, and the stopper being located between the attachment section and the middle section; and
  - (iv) a laterally extending and enclosed through-hole located adjacent an end of the plug, the middle section longitudinally extending between the stopper and the through-hole.

2. The apparatus of claim 1, further comprising a topper covering the plug and the air opening, the topper comprising:
- a single and centrally located topper hole in a laterally enlarged upper surface;
- the through-hole of the plug being accessible through the topper hole when the topper is assembled to the globe; and
- multiple longitudinally elongated fingers downwardly extending from the upper surface with each of the fingers including a curved end.

3. The apparatus of claim 2, further comprising:
- a looped hanger extending through the through-hole in the plug and being externally exposed from the topper;
- the topper being plastic;
- the topper comprising an enclosed and downwardly extending side wall with a top wall spanning across the side wall, the topper hole being located in the top wall, and the side and top walls defining a cross-sectional, substantially inverted U-shape; and
- the flare of the stopper having a concave curved shape when viewed from a longitudinal side thereof.

4. The apparatus of claim 1, further comprising:
- (a) a light mounted to the plug opposite the through-hole, with the light being in the interior of the globe when the plug is inserted into the air opening of the globe; and
- (b) a solar panel or battery connected to the light via wires extending through the plug.

5. The apparatus of claim 1, further comprising a remote controller configured to wirelessly control illumination of a light inside the globe, the light being attached to the plug.

6. The apparatus of claim 1, wherein the attachment section of the plug includes multiple, longitudinally spaced apart and circular ribs.

7. The apparatus of claim 1, wherein:
- the end of the plug, adjacent to the through-hole, is curved; and
- the middle section is longitudinally longer than the attachment section.

8. The apparatus of claim 1, wherein the stopper is laterally wider than the attachment section of the plug, and the stopper is tapered with a laterally narrowest portion thereof being adjacent to the attachment section and a laterally widest portion thereof being adjacent to the middle section.

9. The apparatus of claim 1, further comprising:
- a hanger looping through the through-hole of the plug, is configured to be hung from a tree; and
- a topper covering the plug, the topper and the globe having the appearance of a shiny Christmas tree ornament.

10. The apparatus of claim 1, wherein the globe has an ultraviolet light resistant coating and a diameter of at least 18.5 inches.

11. A decorative ornamental apparatus comprising an air plug comprising:

(a) an externally threaded or externally ribbed inflatable globe-attachment section;
(b) a stopper being tapered with a laterally narrowest portion thereof being adjacent to the attachment section;
(c) an elongated middle section, the stopper being located between the attachment section and the middle section;
(d) the middle section is longitudinally longer than the attachment section, and a laterally widest portion of the stopper being adjacent to the middle section;
(e) a laterally extending through-hole adjacent an end of the plug, the middle section longitudinally extending between the stopper and the through-hole; and
(f) the end of the plug, adjacent to the through-hole, being curved.

12. The apparatus of claim 11, wherein the stopper is laterally wider than the attachment section of the plug.

13. The apparatus of claim 12, wherein a longitudinal length of the attachment section is no less than a longitudinal length of a portion of the stopper that is tapered.

14. The apparatus of claim 11, further comprising a topper covering the plug, the topper comprising:
a single and centrally located topper hole in a laterally enlarged upper surface;
the through-hole of the plug being accessible through the topper hole; and
multiple longitudinally elongated fingers downwardly extending from the upper surface with each of the fingers including a curved end, a peripheral surface defined by the fingers having a cylindrical shape.

15. The apparatus of claim 11, further comprising:
a topper covering the plug;
a looped hanger extending through the through-hole in the plug and being externally exposed from the topper;
the topper being plastic; and
the topper comprising an enclosed and downwardly extending side wall with a top wall spanning across the side wall, the topper hole being located in the top wall, and the side and top walls defining a cross-sectional, substantially inverted U-shape.

16. The apparatus of claim 11, further comprising an LED light mounted to the plug opposite the through-hole.

17. The apparatus of claim 11, wherein the attachment section of the plug includes multiple, longitudinally spaced apart and circular ribs, and the taper of the plug have a concave curved shape when viewed from a longitudinal side thereof.

18. The apparatus of claim 11, further comprising:
an inflatable globe including an air opening in a top thereof, the globe having a diameter of at least 18.5 inches;
a hanger looping through the through-hole of the plug, being configured to be hung from a tree; and
a topper covering the plug, the topper and the globe having the appearance of a shiny Christmas tree ornament; and
the taper of the plug have a concave curved shape when viewed from a longitudinal side thereof.

19. A decorative ornament apparatus comprising a closure configured for removable insertion into an air opening of an inflatable globe, the closure comprising:
(a) a flared stopper having a concave curved shape when viewed from a longitudinal side thereof;
(b) an elongated middle section which is laterally thinner than a laterally widest portion of the stopper, and a longitudinal length of the middle section is larger than its width;
(c) an air opening-engagement section comprising: longitudinally spaced apart and circular ribs, or a thread;
(d) the stopper being located between the opening-engagement section and the middle section;
(e) the middle section longitudinally extending between the stopper and an externally accessible aperture, the aperture being configured to receive a loop therethrough.

20. The apparatus of claim 19, further comprising a topper covering the closure, the topper comprising:
a single and centrally located topper hole in a laterally enlarged upper surface;
the aperture of the closure being accessible through the topper hole; and
multiple longitudinally elongated fingers downwardly extending in a cylindrical shape from the upper surface with each of the fingers including a curved end.

21. The apparatus of claim 20, further comprising:
the loop extending through the aperture in the closure and being externally exposed from the topper;
the topper being plastic; and
the topper comprising an enclosed and downwardly extending cylindrical side wall with a top wall spanning across the side wall, the topper hole being located in the top wall, and the side and top walls defining a cross-sectional, substantially inverted U-shape.

22. The apparatus of claim 19, further comprising an LED light mounted to the closure inside the inflatable globe, and wires extending through the closure.

23. The apparatus of claim 19, wherein the engagement section of the closure includes the ribs.

24. The apparatus of claim 19, further comprising:
the inflatable globe having the closure attached in the air opening thereof, the globe having a diameter of at least 18.5 inches;
the loop extending through the aperture of the closure and being configured to be hung from a tree; and
a topper covering the closure, the topper and the globe having the appearance of a shiny Christmas tree ornament.

25. The apparatus of claim 19, wherein a flared portion of the stopper has a laterally narrowest portion thereof being adjacent to the opening-engagement section and a laterally widest portion thereof being adjacent to the middle section.

* * * * *